(12) United States Patent
Osada et al.

(10) Patent No.: US 8,999,600 B2
(45) Date of Patent: Apr. 7, 2015

(54) SOLID OXIDE ELECTROCHEMICAL CELL

(71) Applicant: Kabushiki Kaisha Toshiba, Minato-ku, Tokyo (JP)

(72) Inventors: Norikazu Osada, Tokyo (JP); Takayuki Fukasawa, Kanagawa (JP); Tsuneji Kameda, Tokyo (JP); Kentaro Matsunaga, Tokyo (JP); Masato Yoshino, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 13/766,879

(22) Filed: Feb. 14, 2013

(65) Prior Publication Data

US 2013/0248360 A1    Sep. 26, 2013

(30) Foreign Application Priority Data

Mar. 26, 2012  (JP) .................. 2012-068784

(51) Int. Cl.
*H01M 8/10*     (2006.01)
*C25B 9/06*     (2006.01)
*C25B 9/08*     (2006.01)
*H01M 8/12*     (2006.01)
*H01M 4/86*     (2006.01)
*H01M 4/90*     (2006.01)

(52) U.S. Cl.
CPC ... *C25B 9/06* (2013.01); *C25B 9/08* (2013.01); *H01M 8/1213* (2013.01); *H01M 8/1246* (2013.01); *H01M 4/8657* (2013.01); *H01M 4/9033* (2013.01); *H01M 2300/0074* (2013.01); *H01M 2300/0094* (2013.01); *Y02E 60/521* (2013.01); *Y02E 60/525* (2013.01)

(58) Field of Classification Search
CPC .................. Y02E 60/525; H01M 2008/1293; H01M 4/9033; H01M 4/9066; H01M 8/1246; H01M 8/1253; H01M 8/2425; H01M 4/8885; H01M 4/9025; H01M 8/126; H01M 2300/0074
USPC .......................... 429/483, 484, 491
See application file for complete search history.

(56) References Cited

U.S. PATENT DOCUMENTS

| | | | | |
|---|---|---|---|---|
| 5,985,476 | A  * | 11/1999 | Wachsman et al. | 429/495 |
| 7,767,358 | B2 * | 8/2010  | Seabaugh et al. | 429/483 |
| 2006/0269813 | A1 * | 11/2006 | Seabaugh et al. | 429/30 |
| 2007/0054170 | A1 * | 3/2007  | Isenberg | 429/33 |
| 2008/0096080 | A1 * | 4/2008  | Batawi et al. | 429/33 |
| 2012/0251922 | A1 * | 10/2012 | Finnerty et al. | 429/484 |

FOREIGN PATENT DOCUMENTS

| | | |
|---|---|---|
| JP | 2006-283103 | 10/2006 |
| JP | 2010-003478 | 1/2010 |

OTHER PUBLICATIONS

Japanese Office Action for Japanese Patent Application No. 2012-068784 mailed Aug. 19, 2014.

* cited by examiner

*Primary Examiner* — Stewart Fraser
(74) *Attorney, Agent, or Firm* — Amin, Turocy & Watson, LLP

(57) ABSTRACT

A solid oxide electrochemical cell of an embodiment includes: a cathode; an anode; and an electrolyte layer interposed between the cathode and the anode, wherein a porous region exists in a layer form in a region with a depth of 50% or less of the electrolyte layer from an anode side surface toward the cathode in the electrolyte layer or between the electrolyte layer and the anode.

13 Claims, 3 Drawing Sheets

SOLID OXIDE ELECTROCHEMICAL CELL

CROSS-REFERENCE TO RELATED APPLICATION

This application is based upon and claims the benefit of priority from Japanese Patent Applications No. 2012-068784, filed on Mar. 26, 2012; the entire contents of which are incorporated herein by reference.

FIELD

Embodiments described herein relate generally to a solid oxide electrochemical cell.

BACKGROUND

A solid oxide electrochemical cell has sufficient reaction speed even without the use of an expensive precious metal catalyst because the electrochemical cell has high operation temperature (600 to 1000° C.). For this reason, a solid oxide electrochemical cell, when being used for a solid oxide fuel cell (SOFC), has the highest power generation efficiency as compared with the other types of fuel cells and generates little $CO_2$, thereby being expected as a next-generation clean power generation system. When a solid oxide electrochemical cell is used for a high-temperature water vapor electrolyzer cell (SOEC), hydrogen can be fabricated at low applied voltage in principle because of the high operation temperature. Accordingly, a solid oxide electrochemical cell is expected also as a high-efficiency hydrogen manufacturing device.

A perovskite type oxide with high conductivity is generally used for an anode of this solid oxide electrochemical cell. The high-temperature operation type often employs a lanthanum-manganese based oxide ($LaMnO_3$ based) for the anode. A middle-to-low-temperature operation type often employs a lanthanum-cobalt based oxide ($LaCoO_3$ based) for the anode. The lanthanum-cobalt based oxide has high catalyst activity, and has high reactivity with a zirconia based oxide ($ZrO_2$) which is generally used for an electrolyte. When these react with each other, a high-resistive phase such as $La_2Zr_2O_7$ is formed, which results in a problem of deterioration in cell performance.

DETAILED DESCRIPTION

A solid oxide electrochemical cell of an embodiment includes: a cathode; an anode; and an electrolyte layer interposed between the cathode and the anode, wherein a porous region exists in a layer form in a region with a depth of 50% or less of the electrolyte layer from an anode side surface toward the cathode in the electrolyte layer or between the electrolyte layer and the anode.

Embodiments of the invention will be described below with reference to the drawings.

First Embodiment

Figure 1:
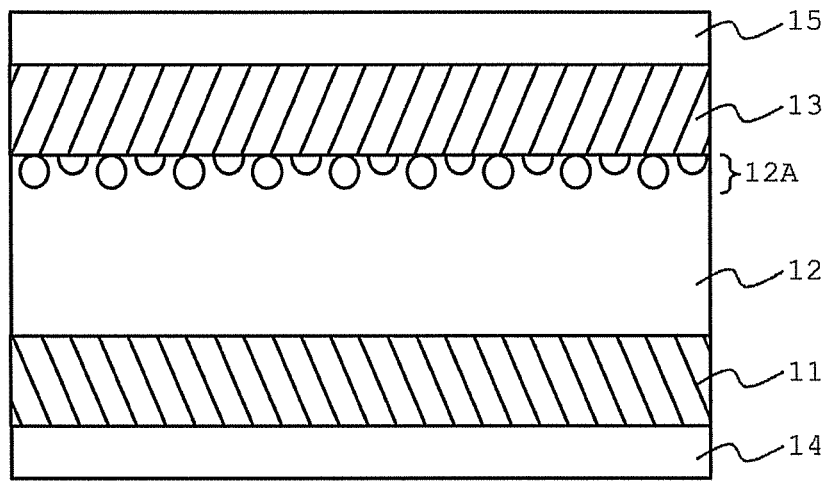
FIG. 1 is a schematic view of a solid oxide electrochemical cell according to a first embodiment.

A solid oxide electrochemical cell 10 according to the first embodiment depicted in the schematic view of FIG. 1 includes a cathode 11, an anode 13, and an electrolyte layer 12 interposed between the cathode 11 and the anode 13. Current collectors 14 and 15 may be stacked so as to be united with the cathode 11 and the anode 13 on surfaces on the reverse side of surfaces of the cathode 11 and the anode 13 that face the electrolyte layer 12 as necessary. A porous region 12A exists in a region of the electrolyte layer 12 with a depth of 10% or less of the electrolyte layer 12 from the surface on the anode 13 side toward the cathode 11. A circular shape illustrated in the porous region 12A in FIG. 1 schematically represents a pore.

For the cathode 11, for example, a sintered including a metal particle and a metal oxide, or a sintered obtained by dissolving a metal into a metal oxide can be used. As the metal included in the sintered or dissolved into the metal oxide, one or more kinds selected from the group including nickel, cobalt, iron, and copper are given. As the metal oxide, stabilized zirconia and the like in which one or more kinds of stabilizers selected from the group including $Y_2O_3$, $Sc_2O_3$, $Yb_2O_3$, $Gd_2O_3$, $Nd_2O_3$, $Al_2O_3$, $CaO$, $MgO$, $CeO_2$, and the like are dissolved, doped ceria in which $CeO_2$ is doped with one or more kinds of oxides selected from the group including $Sm_2O_3$, $Gd_2O_3$, $Y_2O_3$, and the like are given.

The cathode 11 has a thickness of, for example, 0.005 mm or more and 1.0 mm or less.

The metal particle may be used in the form of a complex oxide particle supported by a particle of aluminum oxide or magnesium oxide, for example. As a manufacturing method for the complex oxide particle, for example, a method is given in which NiO powder, which is easily reduced, and $Al_2O_3$ powder, which is difficult to be reduced, are mixed and sintered, and then reduction processing is performed thereon to separate out Ni into $Al_2O_3$. After the fabrication of each layer of the solid oxide electrochemical cell, a cathode precursor including the above easily-reducible oxide may be reduced.

The electrolyte layer 12 includes the doped ceria obtained by doping $CeO_2$ with one or more oxides selected from the group including $Sm_2O_3$, $Gd_2O_3$, $Y_2O_3$, and the like. The porous region 12A is a porous region existing in a layer form in a part in the electrolyte layer 12. The porous region 12A exists, for example, in a region with a depth of 50% or less of the electrolyte layer 12 from the anode 13 side surface toward the cathode 11 in the electrolyte layer 12.

Note that the electrolyte layer 12 excluding the porous region 12A is a dense region. The electrolyte layer 12 excluding the porous region 12A sometimes includes a region with relatively high porosity but the denser region has porosity of 10% or less. The electrolyte layer 12 has a thickness of, for example, 0.005 mm or more and 0.5 mm or less. Since the porous region 12A is a region with difference porosity in the electrolyte layer 12, the porous region 12A and the electrolyte layer 12 include the compound with the same composition. Pores of the porous region 12A are independent, and do not penetrate through the porous region 12A.

The pores of the porous region 12A have an advantage of relaxing the influence of thermal expansion difference between the anode and the electrolyte. Moreover, the interruption of the ion flow in the electrolyte layer 12 by the pores of the porous region 12A can provide the advantage of higher reactivity in the anode because the ions can be dispersed in the electrolyte layer to prevent the current concentration.

The porous region 12A preferably has a porosity of 10% or more and 50% or less. The above advantage is reduced when the porosity is too low. In contrast, too high porosity is not preferable from the viewpoint of the durability of the solid oxide electrochemical cell, the anode activity, and the cell resistance.

When the pore diameter of the porous region 12A is too small, the advantage of relaxing the influence of thermal expansion is reduced. Meanwhile, the too large pore diameter of the porous region 12A is not preferable from the viewpoint of the durability of the solid oxide electrochemical cell. For these reasons, the highest peak of the pore diameter distribution is preferably in the range of 0.01 µm or more and 1 µm or less. The highest peak of the pore diameter distribution is preferably ¼ or less of the thickness of the porous region 12A from the viewpoint of the durability of the solid oxide electrochemical cell and the anode activity.

The porous region 12A has a thickness of, for example 1 µm or more and 50 µm or less. The above advantage is reduced when the thickness of the porous region 12A is too small. In contrast, too large thickness of the porous region 12A is not preferable from the viewpoint of the durability of the solid oxide electrochemical cell, the anode activity, and the cell resistance.

Since the porous region 12A between the electrolyte layer 12 and the anode 13 improves the adhesion between the electrolyte layer 12 and the anode 13, another advantage is provided in which separation, which easily occurs in a SOEC mode, can be prevented.

The anode 13 includes, for example, a sintered including perovskite type oxide ($ABO_3$ type). The perovskite type oxide is represented by $Ln_{1-x}A_xB_{1-y}C_yO_{3-\delta}$. As Ln, for example, a rare-earth element such as La is given. As A, for example, Sr, Ca, Ba, or the like is given. As each of B and C, for example, Cr, Mn, Co, Fe, Ni, or the like is given. Note that x and y of the perovskite type oxide satisfy $0 \leq x \leq 1$ and $0 \leq y \leq 1$. The anode 13 may include, in addition to the perovskite type oxide, doped ceria obtained by doping $CeO_2$ with one or more oxides selected from the group including $Sm_2O_3$, $Gd_2O_3$, $Y_2O_3$, and the like.

The anode 13 has a thickness of, for example, 0.005 mm or more and 1 mm or less.

Note that the anode 13 sometimes includes the oxide of the same element as B and C in the B-site of the perovskite type oxide used for the anode 13, and on this occasion, the anode 13 might include a B-site deficient perovskite type oxide. These element and oxide might be included in the doped ceria of the electrolyte layer 12 including the porous region 12A by dispersion or the like during the sintering of the anode 13. For making the anode 13 or the electrolyte layer 12 include the same element as the B and C of the B-site of the anode 13 or the oxide of the same element, for example, the temperature for sintering the anode 13 may be set at 900° C. or more and 1300° C. or less. The anode 13 of the B-site deficient perovskite type oxide is superior in ion conductivity to the non-B-site deficient type. Since the anode 13 easily limits the rate of ion conduction, the improvement of the ion conductivity of the anode 13 leads to the improvement of the reaction speed of the solid oxide electrochemical cell.

The current collectors 14 and 15 are not limited in particular in this embodiment as long as the current collectors 14 and 15 are the one used as a normal current collector for a solid oxide electrochemical cell, for example, the one obtained by changing the composition ratio of the cathode 11 or the anode 13.

Second Embodiment

Figure 2:
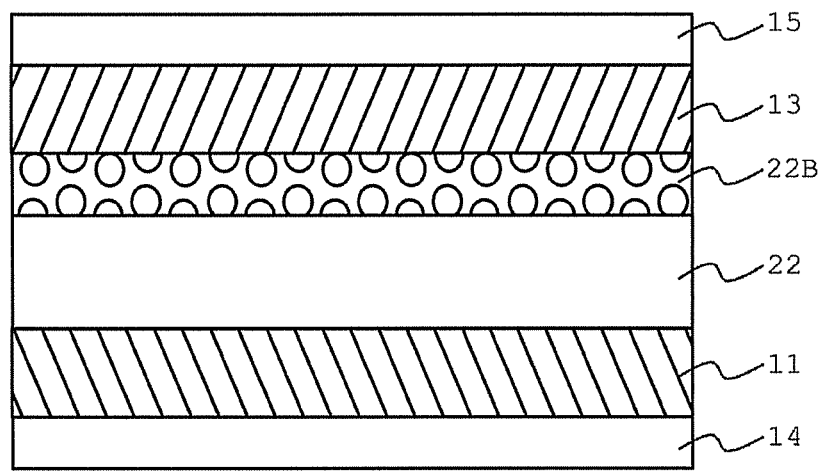
FIG. 2 is a schematic view of a solid oxide electrochemical cell according to a second embodiment.

A solid oxide electrochemical cell 20 according to the second embodiment depicted in the schematic view of FIG. 2 includes the cathode 11, an electrolyte layer 22 on the cathode 11, an interlayer 22B on the electrolyte layer 22, and the anode 13 on the interlayer 22B. Current collectors 14 and 15 may be stacked so as to be united with the cathode 11 and the anode 13 on surfaces on the reverse side of surfaces of the cathode 11 and the anode 13 that face the electrolyte layer 22 as necessary.

A circular shape illustrated in the interlayer 22B in FIG. 2 schematically represents a pore.

The cathode 11, the anode 13, and the current collectors 14 and 15 are similar to the cathode 11, the anode 13, and the current collectors 14 and 15 of the first embodiment, respectively.

The electrolyte layer 22 can be formed using, for example, stabilized zirconia. In this case, the stabilizer may be one or more kinds of oxides selected from the group including $Y_2O_3$, $Sc_2O_3$, $Yb_2O_3$, $Gd_2O_3$, $Nd_2O_3$, $Al_2O_3$, CaO, MgO, $CeO_2$, and the like. These stabilizers can be used by being dissolved into zirconia. As an alternative to the stabilized zirconia, the following can be used: $ABO_3$ perovskite type oxide in which A represents at least one kind selected from La and Sr and B represents at least one kind selected from Ga, Mg, Co, and Fe, such as LaSrGaMg oxide, LaSrGaMgCo oxide, or LaSrGaMgCoFe oxide; or ceria obtained by doping $CeO_2$ with one or more kinds of oxides selected from the group including $Sm_2O_3$, $Gd_2O_3$, $Y_2O_3$, and $La_2O_3$.

Since the element in the A-site of the anode 13 of the perovskite type oxide does not disperse to the electrolyte layer 22, a high-resistance compound such as $La_2Zr_2O_7$ is not formed, so that zirconia can be used for the electrolyte layer 22.

The electrolyte layer 22 has a thickness of for example, 0.005 mm or more and 0.5 mm or less. The electrolyte layer 22 is dense, and preferably has a porosity of 10% or less.

The interlayer 22B is located between the electrolyte layer 22 and the anode 11 is a porous layer (region). The structure, porosity, pore diameter distribution peak, thickness, and advantages of the interlayer 22B are similar to those of the porous region 12A of the first embodiment. The composition of the interlayer is similar to that of the electrolyte layer 22 or the porous region 12A.

Pores of the interlayer 22B are independent pores and do not penetrate through the interlayer 22B. Since the pores of the interlayer 22B are independent, the interlayer 22B prevents direct contact between the electrolyte layer 22 and the anode 13, thereby preventing the formation of a high-resistive phase such as $La_2Zr_2O_7$ in the case where the electrolyte layer 22 includes Zr.

Moreover, since the interlayer 22B between the electrolyte layer 22 and the anode 13 would reduce the difference of thermal expansion coefficient between the layers, an advantage is provided in which the deterioration of the solid oxide electrochemical cell due to the thermal expansion can be prevented.

Note that the composition, thickness, and pore diameter of the member included in the solid oxide electrochemical cell according to this embodiment can be known by cleaving the solid oxide electrochemical cell and measuring the cross section with, for example, a 10000-time magnification SEM-EDX (Scanning Electron Microscope-Energy Dispersive X-ray Detector). As necessary, the compound may be identified with XRD (X-ray Diffraction), EDX, or the like. The porosity can be known by calculating the areas of a pore part and non-pore part in the sectional image. The pore diameter is obtained by dividing the sum of the maximum diameter and the minimum diameter of each pore in the sectional image by 2, and all the pore diameters in the sectional image are calculated. The diameter as the maximum peak in the obtained distribution of the pore diameter is obtained.

Examples are specifically described for further details. In the examples below, the solid oxide electrochemical cell according to the second embodiment was manufactured and each test was performed thereon. The reference symbols of the components in the examples are similar to those of the solid oxide electrochemical cell in FIG. 2.

Example 1

A cathode 11 precursor is fabricated in a manner that mixture powder of Ni oxide particles and $Gd_2O_3$-doped ceria (GDC) with a composition of $(Gd_2O_3)_{0.1}(CeO_2)_{0.9}$ is formed, the obtained powder is made into a paste, and the paste is made into a sheet. After that, scandium stabilized zirconia as the electrolyte layer 22 and GDC as the interlayer 22B were formed sequentially by a spray coating method on the cathode 11 precursor. After that, the cathode 11 precursor-electrolyte layer 12-interlayer 22B are integrally sintered at 1600° C. so that the internal strength of the layers and the interlayer strength of the layers are sufficient. As the anode 13, $La_{0.6}Sr_{0.4}Co_{0.2}Fe_{0.8}O_{3-\delta}$ was formed on the interlayer 22B by a spray coating method and sintering was performed at 1200° C. so that the anode 13 is attached firmly to the interlayer 22B. Thus, the solid oxide electrochemical cell 20 according to the example 1 was manufactured.

The thickness of each layer of the obtained solid oxide electrochemical cell was as follows: the cathode 11 precursor had a thickness of 300 μm, the electrolyte layer 22 had a thickness of 20 μm, the interlayer 22B had a thickness of 7 μm, and the anode 13 had a thickness of 20 μm.

The solid oxide electrochemical cell 20 of the example 1 was installed in an performance evaluation device, and the cathode 11 precursor and the anode 13 were sealed in a Pyrex (registered trademark) glass material. After that, the temperature is increased up to the temperature at which the Pyrex (registered trademark) glass is softened and then hydrogen is introduced to the cathode 11 precursor. Then, NiO in the cathode 11 precursor is reduced, so that the precursor becomes the cathode 11.

The cathode performance evaluation device operates the solid oxide electrochemical cell 20 in the SOEC mode, so that the I-V characteristic at that time can be evaluated.

After the reduction reaction, the temperature of the solid oxide electrochemical cell is reduced down to 800° C., which is the measurement temperature, and then the solid oxide electrochemical cell is operated in the SOEC mode. The I-V characteristic in the initial state, which corresponds to the state at the operation start time, was performed. After the end of the initial test in which the solid oxide electrochemical cell was continuously operated for 6500 hours, the solid oxide electrochemical cell was cleaved and the section was magnified by 10000 times and observed with SEM.

Example 2

The solid oxide electrochemical cell was manufactured in a manner similar to Example 1, and the I-V performance on the initial state was performed. After the end of the initial test in which the solid oxide electrochemical cell 20 was continuously operated for 2000 hours, the solid oxide electrochemical cell was cleaved and the section was magnified by 5000 times and observed with SEM.

Example 3

The solid oxide electrochemical cell was manufactured in a manner similar to Example 1, and the I-V performance on the initial state was performed. Then, the continuous operation test at 0.2 $A/cm^2$ for 6500 hours was performed. After the end of the long-term operation for 6500 hours, the I-V characteristic was performed. After the evaluation test, the solid oxide electrochemical cell 20 was cleaved and the section was magnified by 10000 times and observed with SEM.

Comparative Example 1

The solid oxide electrochemical cell was manufactured in a manner similar to Example 1 except that a dense GDC was manufactured for the interlayer 22B, and the similar I-V characteristic was performed.

(Initial I-V Characteristic Evaluation Test)

Table 1 represents the cell voltages (applied voltage) at 0.2 $A/cm^2$ as the I-V characteristic results in the initial state of Examples 1-3. The applied voltage difference of Examples 1-3 was within approximately 50 mV. Meanwhile, in the I-V characteristic result in Comparative Example 1 without the porous interlayer 22B, the cell voltage at the constant current is higher than that of Examples by approximately 10%, and this indicates that a large amount of energy is necessary for generating the same amount of hydrogen. In Examples, it is considered that the cell efficiency is increased because the porous interlayer 22B decentralizes the current and prevents the current concentration. Note that it is considered that this effect is more remarkable in the case of a cathode supported cell (cathode area>anode area)

TABLE 1

| Example | Applied voltage [V] |
| --- | --- |
| Example 1 | 1.05 |
| Example 2 | 1.07 |
| Example 3 | 1.02 |
| Comparative Example 1 | 1.15 |

(Deterioration Ratio of Solid Oxide Electrochemical Cell after Predetermined-Time Operation)

As a result of calculating the increase ratio between the initial state in the SOEC mode and the cell voltage after the continuous operation for 6500 hours, the deterioration ratio of the cell was as small as 0.78%/1000 hours. It was confirmed that the solid oxide electrochemical cell operated stably with a low deterioration ratio for 6500 hours.

(Comparison of Sectional Image of Solid Oxide Electrochemical Cell after Predetermined-Time Operation)

Figure 3:
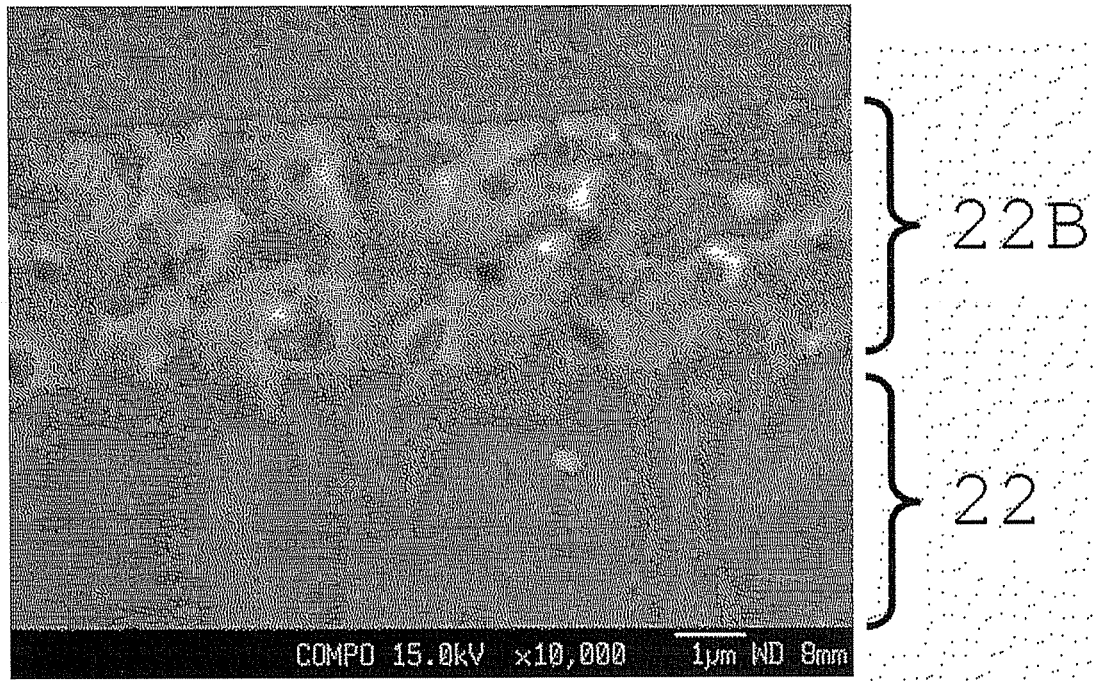
FIG. 3 is a SEM sectional image of a solid oxide electrochemical cell according to an example 1.
Figure 4:
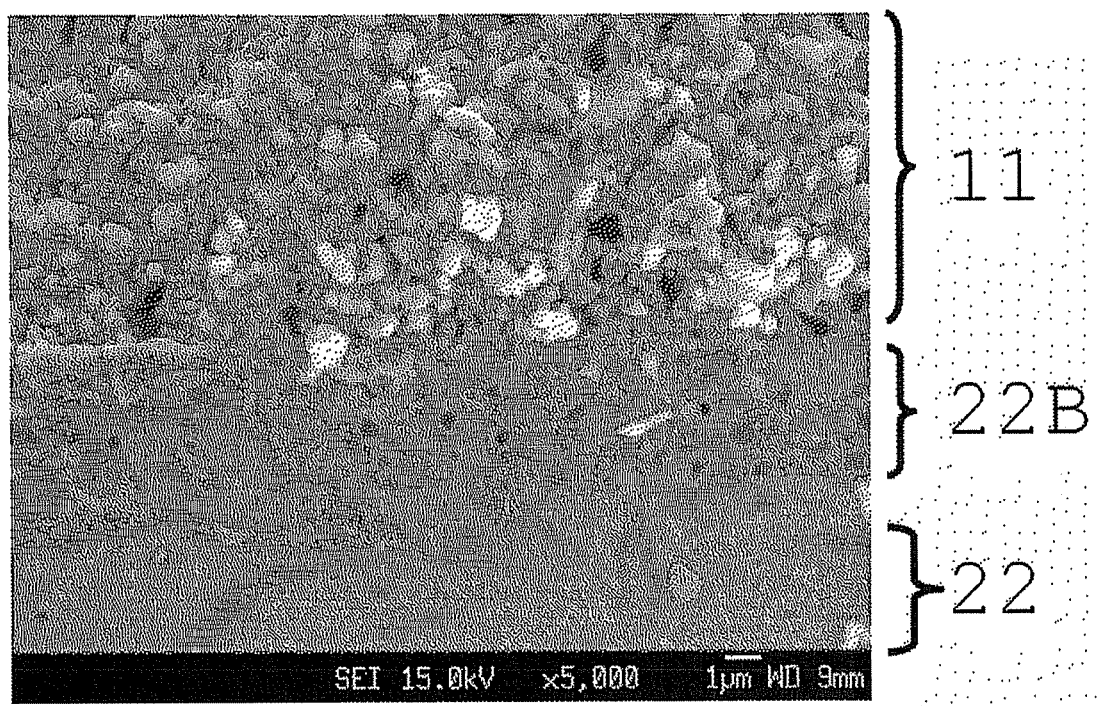
FIG. 4 is a SEM sectional image of a solid oxide electrochemical cell according to an example 2.
Figure 5:
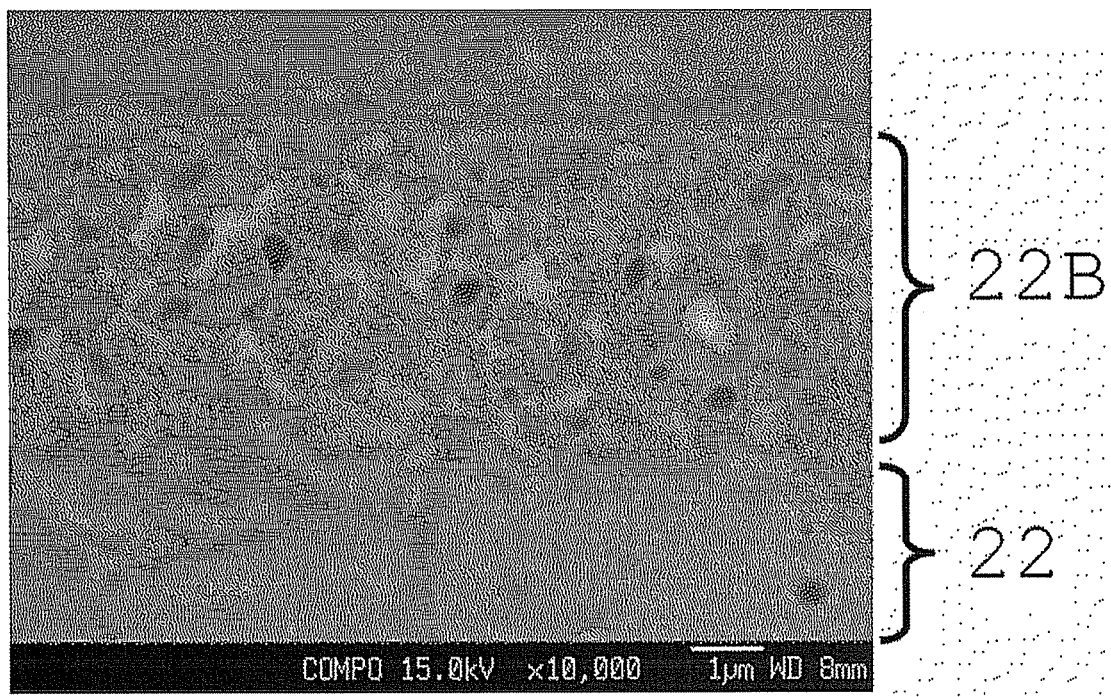
FIG. 5 is a SEM sectional image of a solid oxide electrochemical cell according to an example 3.

FIG. 3, FIG. 4, and FIG. 5 are a SEM image of Example 1, a SEM image of Example 2, and a SEM image of Example 5, respectively. It can be confirmed from the comparison among the images that the interlayer maintains the porous state during the period from the start of the operation until the completion of the 6500-hour continuous operation. The separation between the interlayer 22B and the electrolyte layer 22 does not occur. Accordingly, it was confirmed that the solid oxide electrochemical cell of the embodiment maintains the porous state of the interlayer 22B and the improvement effect of the adhesion between the layers is also maintained for a long time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid oxide electrochemical cell comprising:
   a first electrode;
   a second electrode; and
   an electrolyte layer interposed between the first electrode and the second electrode,
   wherein a porous region exists in a layer form in a region with a depth of 50% or less of the electrolyte layer from a second electrode side surface toward the first electrode in the electrolyte layer or between the electrolyte layer and the second electrode,
   the first electrode includes a sintered material including a metal particle and a metal oxide, or a sintered material obtained by dissolving a metal into a metal oxide, wherein the metal is one or more kinds selected from the group including nickel, cobalt, iron and copper, and,
   the second electrode includes a perovskite type oxide represented by $ABO_3$.

2. The cell according to claim 1, wherein a pore of the porous region does not penetrate through the porous region.

3. The cell according to claim 1, wherein the porous region has a porosity of 10% or more and 50% or less.

4. The cell according to claim 1, wherein the porous region has a highest peak of pore diameter distribution in a range of 0.01 μm or more to 1 μm or less.

5. The cell according to claim 1, wherein the porous region has a highest peak of pore diameter distribution being ¼ or less of the thickness of the porous region.

6. The cell according to claim 1, wherein the porous region has a thickness of 1 μm or more and 50 μm or less.

7. The cell according to claim 1, wherein:
   the electrolyte layer includes any of stabilized zirconia in which one or more kinds of oxides selected from the group including $Y_2O_3$, $Sc_2O_3$, $Yb_2O_3$, $Gd_2O_3$, $Nd_2O_3$, $Al_2O_3$, $CaO$, $MgO$, and $CeO_2$ is used as a stabilizer, an $\alpha\beta O_3$ perovskite type oxide in which α represents at least one element selected from La and Sr and β represents at least one element selected from Ga, Mg, Co, and Fe, and doped ceria in which $CeO_2$ is doped with one or more kinds of oxides selected from the group including $Sm_2O_3$, $Gd_2O_3$, $Y_2O_3$, and $La_2O_3$.

8. The cell according to claim 7, wherein:
   the layer form of the porous region includes doped ceria in which $CeO_2$ is doped with one or more kinds of oxides selected from the group including $Sm_2O_3$, $Gd_2O_3$, and $Y_2O_3$.

9. The cell according to claim 1, wherein each of the electrolyte and the porous region existing at an interface between the electrolyte layer and the second electrode is doped ceria in which $CeO_2$ is doped with one or more kinds of oxides selected from the group including $Sm_2O_3$, $Gd_2O_3$, and $Y_2O_3$.

10. The cell according to claim 1, wherein
    the second electrode includes an oxide of a same element as a B-site element of the perovskite type oxide.

11. The cell according to claim 9, wherein the porous region includes an oxide of a same element as a B-site element of the perovskite type oxide of the second electrode and the same element as the B-site element of the perovskite type oxide of the second electrode.

12. The cell according to claim 1, wherein A of $ABO_3$ represents at least one element selected from a rare-earth element, Ca, Sr, and Ba, and B of $ABO_3$ represents at least one element selected from Cr, Mn, Fe, Co, and Ni.

13. The cell according to claim 1, wherein:
    the electrolyte layer consists any of stabilized zirconia in which one or more kinds of oxides selected from the group consisting $Y_2O_3$, $\alpha\beta O_3$ perovskite type oxide in which a represents at least one element selected from La and Sr and β represents at least one element selected from Ga, Mg, Co, and Fe, and doped ceria in which $CeO_2$ is doped with one or more kinds of oxides selected from $Sm_2O_3$, $Gd_2O_3$, $Y_2O_3$, and $La_2O_3$, and
    the layer form of the porous region consists doped ceria in which $CeO_2$ is doped with one or more kinds of oxides selected from $Sm_2O_3$, $Gd_2O_3$, and $Y_2O_3$.

* * * * *